(12) United States Patent
Lemmers, Jr. et al.

(10) Patent No.: US 8,796,892 B2
(45) Date of Patent: Aug. 5, 2014

(54) MULTI-POLE GENERATOR PACKAGING ARRANGEMENT HAVING A DISCONNECTION SYSTEM

(75) Inventors: Glenn C. Lemmers, Jr., Loves Park, IL (US); David S. Behling, Belvidere, IL (US); Timothy R. Welch, Roscoe, IL (US); Ted A. Martin, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 619 days.

(21) Appl. No.: 12/787,353

(22) Filed: May 25, 2010

(65) Prior Publication Data

US 2011/0148233 A1 Jun. 23, 2011

Related U.S. Application Data

(60) Provisional application No. 61/284,451, filed on Dec. 18, 2009, provisional application No. 61/284,452, filed on Dec. 18, 2009, provisional application No. 61/284,453, filed on Dec. 18, 2009.

(51) Int. Cl.
*H02K 7/06* (2006.01)
*H02K 7/10* (2006.01)

(52) U.S. Cl.
USPC ............... 310/83; 310/75 R; 310/78; 310/99

(58) Field of Classification Search
USPC ................. 310/83, 75 R, 78, 96, 99, 100
IPC ............................................... H02K 7/10,7/06
See application file for complete search history.

(56) References Cited

U.S. PATENT DOCUMENTS

| | | | |
|---|---|---|---|
| 3,577,002 A * | 5/1971 | Hall et al. | 290/46 |
| 3,800,212 A * | 3/1974 | Branco et al. | 322/28 |
| 4,545,470 A | 10/1985 | Grimm | |
| 4,694,187 A * | 9/1987 | Baker | 290/4 R |
| 4,997,072 A | 3/1991 | Lapthorne | |
| 5,023,789 A | 6/1991 | Lampe et al. | |
| 5,029,689 A | 7/1991 | Grimm | |
| 5,174,109 A | 12/1992 | Lampe | |
| 5,325,009 A | 6/1994 | Capion et al. | |
| 5,562,190 A | 10/1996 | McArthur | |
| 6,897,581 B2 | 5/2005 | Doherty et al. | |
| 7,084,522 B2 | 8/2006 | Wobben | |

(Continued)

FOREIGN PATENT DOCUMENTS

FR WO2007096493 * 8/2007 ............. F02C 7/275

OTHER PUBLICATIONS

Machine translation of WO2007096493, Berenger et al., Aug. 2007.*

(Continued)

*Primary Examiner* — Terrance Kenerly
(74) *Attorney, Agent, or Firm* — Carlson, Gaskey & Olds, P.C.

(57) ABSTRACT

A generator includes a drive gear mounted to a main rotor shaft though a drive gear bearing and an input jaw plate keyed to the drive gear for rotation therewith, the input jaw plate defines input jaws which selectively mesh with the disconnect jaws, the disconnect shaft axially movable in response to a disconnect system which axially separates input jaws and the disconnect jaws to permit relative rotation between a main rotor shaft and the drive gear through the drive gear bearing.

10 Claims, 4 Drawing Sheets

(56) References Cited

U.S. PATENT DOCUMENTS

| | | |
|---|---|---|
| 7,131,275 B2 | 11/2006 | Gustafson |
| 2004/0245879 A1* | 12/2004 | Hirzel et al. ............. 310/156.01 |
| 2005/0184608 A1* | 8/2005 | Williams et al. ................ 310/89 |
| 2006/0059943 A1 | 3/2006 | Merritt et al. |
| 2008/0180001 A1* | 7/2008 | Dai ............................ 310/75 B |
| 2009/0042656 A1* | 2/2009 | Takigawa et al. ............. 464/102 |
| 2009/0324396 A1 | 12/2009 | Short et al. |

OTHER PUBLICATIONS

Generator Rotor With Improved Hollow Shaft, U.S. Appl. No. 12/436,161, filed May 6, 2009.

Decoupler Shaft for High Speed Generator, U.S. Appl. No. 12/436,159, filed May 6, 2009.

\* cited by examiner

DISCONNECTED

MULTI-POLE GENERATOR PACKAGING ARRANGEMENT HAVING A DISCONNECTION SYSTEM

The present disclosure claims priority to U.S. Provisional Patent Application No. 61/284,451, filed Dec. 18, 2009; U.S. Provisional Patent Application No. 61/284,452, filed Dec. 18, 2009; and U.S. Provisional Patent Application No. 61/284,453, filed Dec. 18, 2009.

BACKGROUND

The present disclosure relates to a generator packaging arrangement which facilitates heavier generator installation onto smaller gearboxes without adversely affecting the gearbox weight yet maintains desired generator design features.

As modern commercial aircraft transition to a more electric architecture, relatively larger generators are being installed into smaller engine nacelles. These relatively heavier generators are also being mounted to smaller accessory gearboxes. As generator weight begins to account for the majority of the accessory gearbox load, specific design changes to the accessory gearbox may be necessary to accommodate the generator. Also, as the generator is typically cantilever mounted off the accessory gearbox, heavier generators may result in increased overhung bending moments which require increased accessory gearbox housing wall thicknesses and weight.

SUMMARY

An accessory system according to an exemplary aspect of the present disclosure includes a 4-Pole generator integrally mounted with an accessory gearbox such that a drive gear of the generator is in meshing engagement with the geartrain.

A 4-Pole generator according to an exemplary aspect of the present disclosure includes a generator housing which defines a flange. A drive shaft assembly is supported within the generator housing and a main generator power section is supported on the drive shaft assembly axially adjacent the flange.

A generator according to an exemplary aspect of the present disclosure includes a drive gear mounted to a main rotor shaft though a drive gear bearing and an input jaw plate keyed to the drive gear for rotation therewith, the input jaw plate defines input jaws which selectively mesh with the disconnect jaws, the disconnect shaft axially movable in response to a disconnect system which axially separates input jaws and the disconnect jaws to permit relative rotation between a main rotor shaft and the drive gear through the drive gear bearing.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
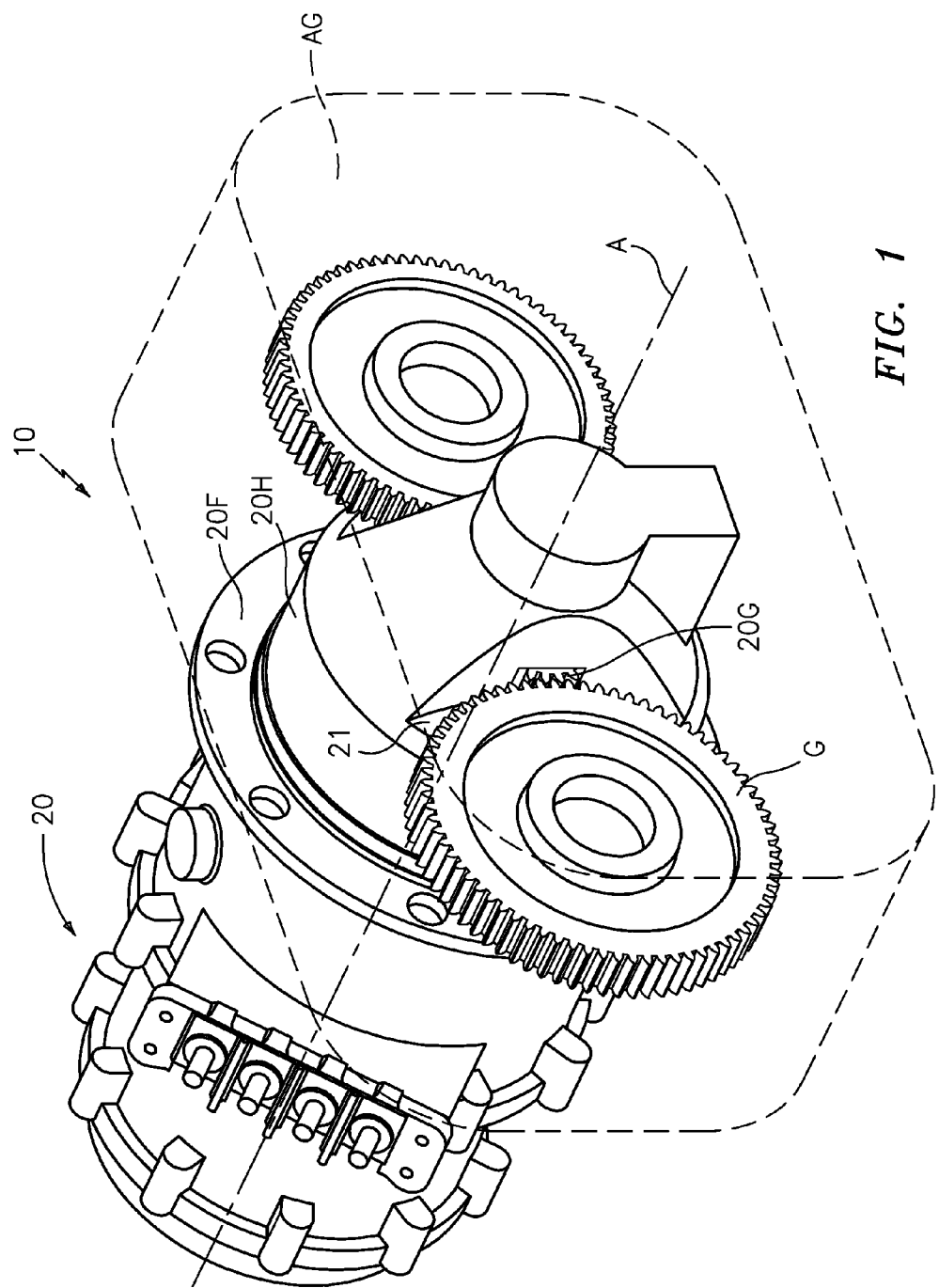
FIG. 1 is a general perspective view of a generator which mounts to an aircraft accessory gearbox.

FIG. 1 schematically illustrates a generator 20 which mounts to an aircraft accessory gearbox AG (illustrated schematically) though a drive gear 20G which rotates about a generator axis of rotation A to form an accessory gearbox system 10. It should be understood that the generator 20 may alternatively be a starter generator.

The generator 20 includes a generator housing 20H which defines a mounting flange 20F that is axially outboard of the drive gear 20G relative to the accessory gearbox AG. The drive gear 20G extends through a side area of the generator housing 20H at a scallop 21 to mesh with the geartrain G within the accessory gearbox AG. The drive gear 20G is integral with the geartrain G of the accessory gearbox AG. That is, the drive gear 20G is part of the geartrain G such that gears downstream of the drive gear 20G are utilized to drive associated accessory systems.

Figure 2:
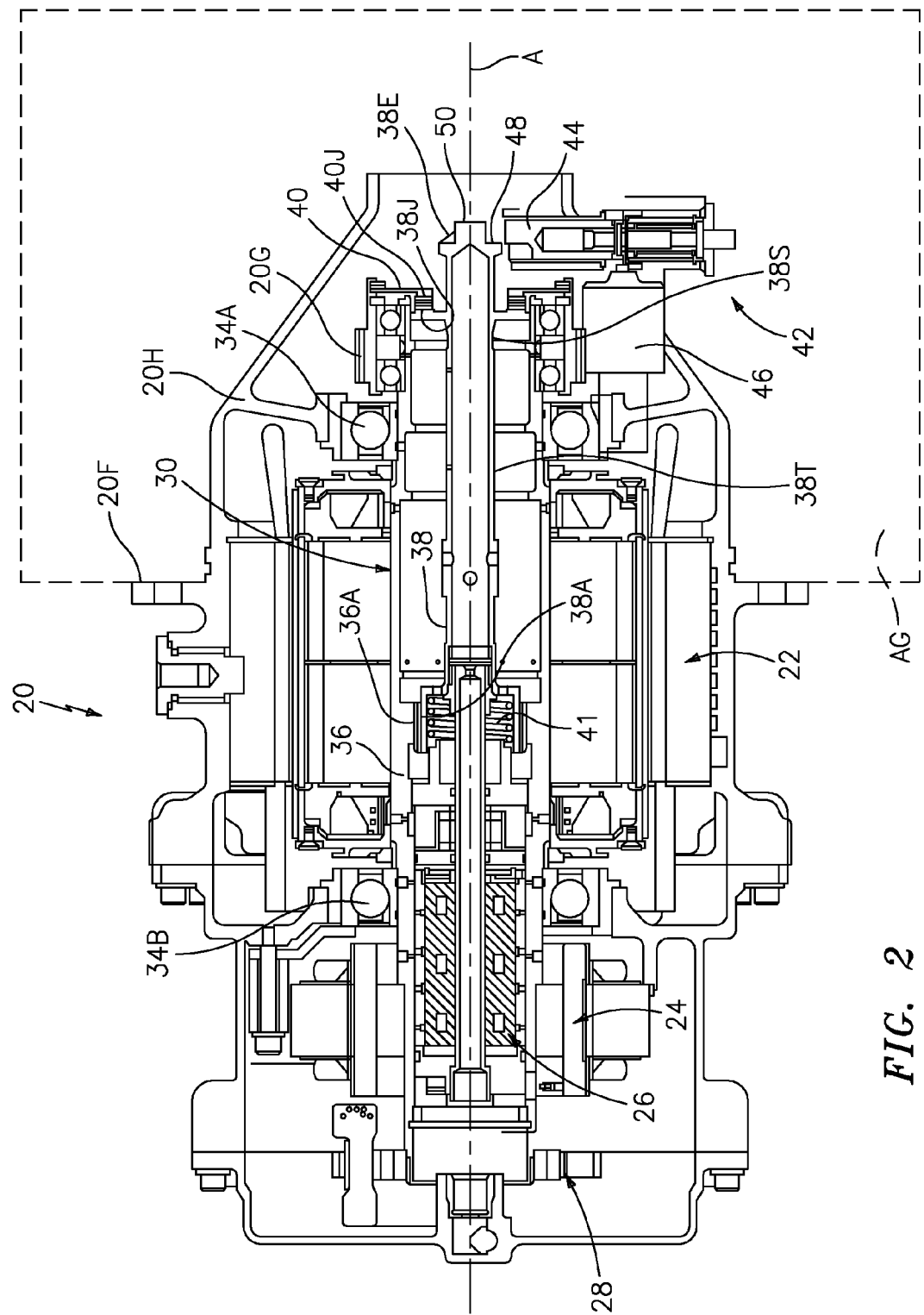
FIG. 2 is a sectional view of the generator connected to the accessory gearbox.

With reference to FIG. 2, the generator 20 generally includes a main generator power section 22, an exciter 24, a rectifier assembly 26 and an optional permanent magnet generator (PMG) 28. The generator 20 provides a packaging arrangement in which the heaviest portions of the generator 20 such as the main generator power section 22 are located generally adjacent to the gearbox mounting flange 20F and at least partially within the accessory gearbox AG. In the disclosed, non-limiting embodiment, a 4-Pole Integrally Mounted Gearbox Generator is illustrated. It should be appreciated that a 2-pole machine operates at a relatively higher speed and may have a relatively larger core than a 4-pole machine, however a 4-pole machine provides relatively greater rotor mechanical strength and may have relatively greater reliability. It should be appreciated that any pole count design generator may be integrated with an accessory gearbox AG as described herein The main generator power section 22 provides alternating current (AC) power to an aircraft electrical bus (not shown). The exciter 24 provides excitation current to the field of the main generator power section 22. The rectifier assembly 26 provides conversion of exciter armature alternating current (AC) power into direct current (DC) power for the main field portion of the main generator power section 22. If generator self-excitation is required, the generator 20 will also include the PMG 28 which provides AC power to the generator control unit for generator field excitation power.

The main generator power section 22, the exciter 24 and the optional PMG 28 are mounted on a common rotor shaft assembly 30 which is supported within the generator housing 20H of the generator 20 by main bearings 34A, 34B. In one non-limiting embodiment, the gearbox mounting flange 20F and the main generator power section 22 are axially located between the main bearings 34A, 34B, the exciter 24 is mounted on the rotor shaft assembly 30 axially outboard of the second main bearing 34B. The PMG 28 is axially outboard of the exciter 24, and exciter 24 is mounted opposite the accessory gearbox AG, i.e. the main field/stator is located between the exciter 24 and the drive gear 20G.

The rotor shaft assembly 30 generally includes a main rotor shaft 36 and a disconnect shaft 38. Splines 36A are formed at an axially intermediate portion of an inner bore of the main rotor shaft 36 and mate with splines 38A on the disconnect shaft 38. The disconnect shaft 38 in the disclosed non-limiting embodiment includes a reduced diameter torsional section 38T and a shear section 38S. The torsional section 38T provides a relatively low torsional stiffness to minimize torque spike transmissibility. The shear section 38S is essentially a fuse which will break should excessive gear train torque loads occur.

A disconnect system 42 provides the ability to mechanically disengage the generator 20 from the accessory gearbox AG should a generator failure occur. The disconnect system 42 includes disconnect jaws 38J adjacent to an end section of the disconnect shaft 38 which selectively mesh with inputs jaws 40J on an input jaw plate 40. A spring 41 biases the disconnect shaft 38 away from the main rotor shaft 36. The input jaw plate 40 is keyed to the drive gear 20G to transfer torque there between. The input jaw plate 40 permits selective relative rotation between the main rotor shaft 36 and the drive gear 20G when the disconnect jaw 38J is axially separated from the input jaw 40J in response to actuation of the disconnect system 42 as seen in FIG. 3 when it is desired that there not be operation of the generator 20.

The disconnect system 42 generally includes a plunger 44 which is selectively actuated by an electric/thermal solenoid 46. When actuated, the plunger 44 is moved into the position illustrated in FIG. 3, and rides along a ramp helix 48 of the disconnect shaft 38 to a lockout diameter 50 which maintains the disconnect jaw 38J axially separated from the input jaw plate 40. That is, engagement of the plunger 44 with the ramp helix 48 results in axial translation of the disconnect shaft 38 along the splined interface 36A-38A to separate the disconnect jaw 38J from the input jaw 40J which disconnects the drive gear 20G from the rotor shaft assembly 30. In one non-limiting embodiment, the lockout diameter is a distal end 38E of said disconnect shaft 38.

Figure 3:
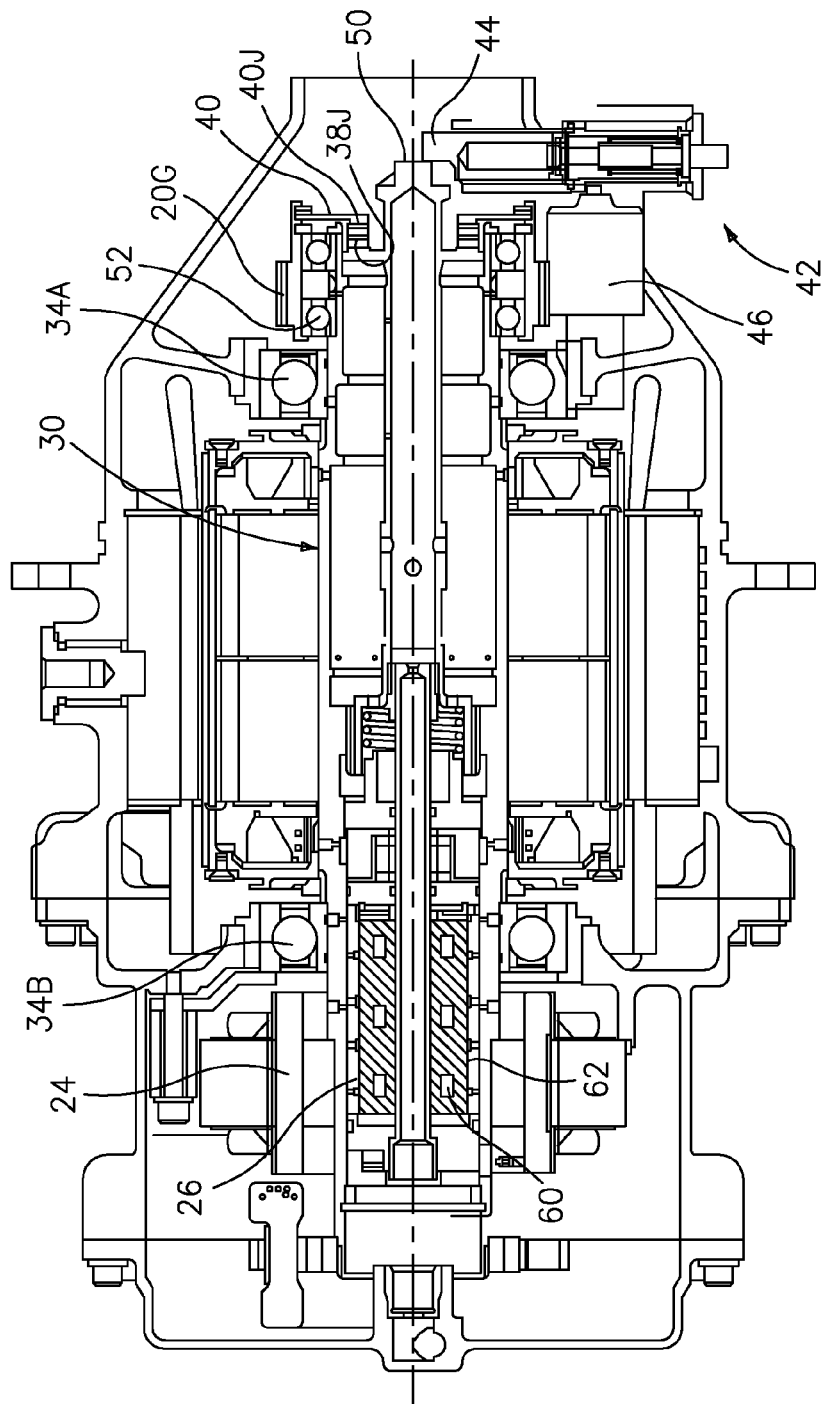
FIG. 3 is a sectional view of the generator disconnected from the accessory gearbox.

With reference to FIG. 3, once the jaws 38J, 40J have separated, the mechanical power transmitted into the rotor shaft assembly 30 ceases and the speed of the generator 20 coasts down to zero rpm through a drive gear bearing 52 packaged between the rotor drive gear 20G and the rotor shaft assembly 30. In one non-limiting embodiment, the drive gear bearing 52 is axially outboard of the main bearing 34A. The drive gear bearing 52 allows the drive gear 20G to continue rotation and thereby transmit power to any downstream systems. If a generator failure should occur, for example, the generator 20 may be disconnected from the accessory gearbox AG without effect to downstream systems which are in meshed engagement through the geartrain G. That is, the accessory gearbox AG can still drive the downstream system with the generator 20 disconnected from the accessory gearbox AG even though drive gear 20G is integral with geartrain G.

The disconnect system 42 can be electrically actuated via the electric/thermal solenoid 46 or direct mechanical actuation through, for example, melting of lock such as a eutectic solder. The disconnect system 42 may be externally resettable in a manual manner during a maintenance procedure.

The rectifier assembly 26 is mounted internal to the rotor shaft assembly 30. The rectifier assembly 26 typically includes three or six discreet diodes 60 arranged such that they provide rectification of the AC power developed by the exciter 24. The DC output of the rectifier assembly 26 is fed into the main field of the main generator power section 22.

Location of the diodes 60 internal to the rotor shaft assembly 30 provides an efficient use of space within the generator 20. The discreet diodes 60 and associated electrical connections are arranged in a compact fashion such that the diodes 60 readily will fit within a diode housing 62 fit into the rotor shaft assembly 30. The diode housing 62 provides support to the diodes 60, electrical connections and insulation of the various electrical circuits. It should be understood that additional components may be provided within the diode housing 62 to provide support and electrical insulation.

Figure 4:
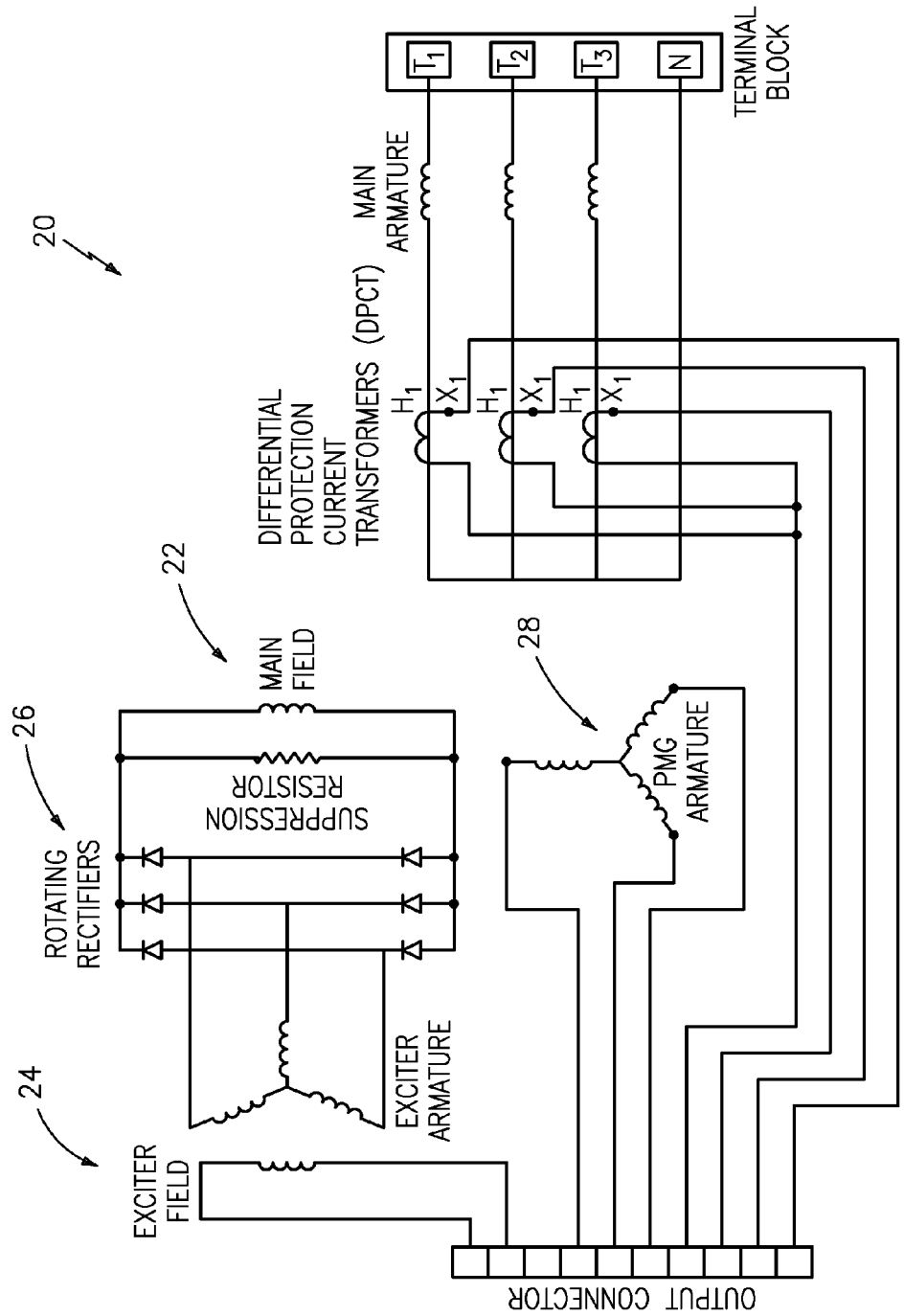
FIG. 4 is an electrical schematic of the generator.

With reference to FIG. 4, the three phase output of the exciter 24 is connected to the rotating rectifier AC connections and the DC output of the rectifier assembly 26 is connected to the main generator power section 22. The AC output of the exciter 24 is provided to the rectifier assembly 26 via lead wires which extend inward from the exciter 24 to the rectifier assembly 26. The lead wires are attached to the individual windings within the exciter 24 and connected individually to the three AC circuits within the rectifier assembly 26. The DC output of the rectifier assembly 26 is connected to the main generator power section 22 via wires or bus bars which extend axially and radially from the rectifier assembly 26 to the main generator power section 22.

The generator 20 arrangement disclosed herein also allows a resolver (not shown) to be packaged therein. The resolver is a rotary device that includes a rotor and a stator. The resolver rotor is mounted to the rotor shaft assembly 30 and the stator is mounted to the housing. The resolver provides an electrical signal that can be used by a control unit for the generator or starter/generator to identify the position of the generator or starter/generator rotor relative to the housing. The exact construction of the resolver rotor and stator varies, and may consist of a wound rotor or a solid rotor. The resolver stator consists of one or more windings which couple with the rotating magnetic field produced by the resolver rotor. This coupling produces an electrical signal within the stator windings that is fed to the control unit to determine rotor position. Rotor position information is used by the control unit to determine the appropriate control signals that must be applied to the generator or starter/generator to achieve proper operation.

The generator 20 provides a packaging arrangement in which the heaviest portions of the generator 20 are located close to the gearbox mounting flange 20F. This minimizes the overhung moment that must be reacted by the accessory gearbox AG and allows both the generator housing and accessory gearbox housings to be lighter. This packaging arrangement also minimizes housing and shaft/bearing weight between the generator 20 and accessory gearbox AG as they share components.

Even with the minimized overhung moment, the generator 20 provides a packaging arrangement that maintains desired generator design features such as a generator mechanical input shaft shear fuse (shear section) should excessive gear train torque loads occur, a shaft with a relatively low torsional stiffness to minimize torque spike transmissibility, the ability to mechanically disengage (mechanically disconnect) the generator from the gearbox if a generator failure should occur, the ability to package a resolver for start performance, and a shaft internal rectifier assembly packaging arrangement.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A 4-Pole generator comprising:
a generator housing which defines a flange;
a drive shaft assembly supported within said generator housing;
a main generator power section supported on said drive shaft assembly axially adjacent said flange; and
a drive gear selectively connected to said drive shaft assembly through a disconnect system, wherein said disconnect system further comprises:
a main rotor shaft which defines main shaft splines;
a disconnect shaft which defines disconnect shaft splines and disconnect jaws, said disconnect shaft splines mate with said main shaft splines; and
an input jaw plate keyed to said drive gear for rotation therewith, said input jaw plate defines input jaws which selectively mesh with said disconnect jaws, said disconnect shaft axially movable in response to a disconnect system which axially separates said input jaws and said disconnect jaws to permit relative rotation between said main rotor shaft and said drive gear through a drive gear bearing.

2. A generator comprising:
a main rotor shaft which defines main shaft splines;
a disconnect shaft which defines disconnect shaft splines and disconnect jaws, said disconnect shaft splines mate with said main shaft splines;
a drive gear mounted to said main rotor shaft though a drive gear bearing;
an input jaw plate keyed to said drive gear for rotation therewith, said input jaw plate defines input jaws which selectively mesh with said disconnect jaws, said disconnect shaft axially movable in response to a disconnect system which axially separates said input jaws and said disconnect jaws to permit relative rotation between said main rotor shaft and said drive gear through said drive gear bearing.

3. The generator as recited in claim 2, wherein said main shaft splines are formed on an inner bore of said main rotor shaft.

4. The generator as recited in claim 2, wherein said disconnect system includes a disconnect plunger which selectively contacts a ramp helix on said disconnect shaft to axially drive said disconnect shaft relative to said main rotor shaft along said main shaft splines and said disconnect shaft splines.

5. The generator as recited in claim 2, wherein said drive gear extends through an opening defined through a scallop formed in a gearbox housing.

6. The generator as recited in claim 5, wherein said drive gear is axially outboard of a first main bearing which supports said main rotor shaft within said gearbox housing.

7. The generator as recited in claim 2, further comprising a main generator power section supported on said main rotor shaft inboard of said first main bearing and a second main bearing.

8. The generator as recited in claim 7, further comprising a mounting flange defined by said generator housing, said mounting flange axially located between said first main bearing and said second main bearing.

9. The generator as recited in claim 2, wherein said main rotor shaft includes a shear section.

10. The generator as recited in claim 2, wherein said main rotor shaft includes a torsionally compliant section.

* * * * *